(12) United States Patent
Regunathan et al.

(10) Patent No.: US 8,014,450 B2
(45) Date of Patent: Sep. 6, 2011

(54) FLEXIBLE RANGE REDUCTION

(75) Inventors: Shankar Regunathan, Bellevue, WA (US); Sridhar Srinivasan, Redmond, WA (US); Jie Liang, Coquitlam (CA); Chih-Lung Lin, Redmond, WA (US); Minghui Xia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1240 days.

(21) Appl. No.: 10/989,702

(22) Filed: Nov. 15, 2004

(65) Prior Publication Data

US 2005/0063471 A1    Mar. 24, 2005

Related U.S. Application Data

(63) Continuation-in-part of application No. 10/933,907, filed on Sep. 2, 2004, which is a continuation-in-part of application No. 10/857,473, filed on May 27, 2004, now Pat. No. 7,567,617.

(60) Provisional application No. 60/501,081, filed on Sep. 7, 2003.

(51) Int. Cl.
*H04N 7/12* (2006.01)
(52) U.S. Cl. .................................. 375/240.12
(58) Field of Classification Search .............. 375/240.12
See application file for complete search history.

(56) References Cited

U.S. PATENT DOCUMENTS

| | | | |
|---|---|---|---|
| 5,404,166 A * | 4/1995 | Gillard et al. ............... 348/390.1 |
| 5,414,469 A | 5/1995 | Gonzales et al. | |
| 5,465,118 A | 11/1995 | Hancock et al. | |
| 5,467,134 A | 11/1995 | Laney et al. | |
| 5,544,286 A | 8/1996 | Laney | |
| 5,611,038 A | 3/1997 | Shaw et al. | |
| 5,699,124 A | 12/1997 | Nuber et al. | |
| 5,737,023 A | 4/1998 | Linzer | |
| 5,805,228 A * | 9/1998 | Proctor et al. ........... 375/240.22 |
| 5,970,173 A | 10/1999 | Lee et al. | |
| 6,256,347 B1 | 7/2001 | Yu et al. | |
| 6,259,810 B1 | 7/2001 | Gill et al. | |
| 6,389,071 B1 | 5/2002 | Wilson | |
| 6,483,938 B1 | 11/2002 | Hennessey et al. | |
| 6,519,288 B1 | 2/2003 | Vetro et al. | |
| 6,606,481 B1 | 8/2003 | Tegler et al. | |
| 6,778,711 B2 | 8/2004 | Morita | |

(Continued)

OTHER PUBLICATIONS

Reader, "History of MPEG Video Compression—Ver. 4.0," 99 pp., document marked Dec. 16, 2003.

(Continued)

*Primary Examiner* — Jayanti K Patel
*Assistant Examiner* — Richard Torrente
(74) *Attorney, Agent, or Firm* — Klarquist Sparkman LLP

(57) ABSTRACT

Techniques and tools are described for flexible range reduction of samples of video. For example, an encoder signals a first set of one or more syntax elements for range reduction of luma samples and signals a second set of one or more syntax elements for range reduction of chroma samples. The encoder selectively scales down the luma samples and chroma samples in a manner consistent with the first syntax element(s) and second syntax element(s), respectively. Or, an encoder signals range reduction syntax element(s) in an entry point header for an entry point segment, where the syntax element(s) apply to pictures in the entry point segment. If range reduction is used for the pictures, the encoder scales down samples of the pictures. Otherwise, the encoder skips the scaling down. A decoder performs corresponding parsing and scaling up operations.

25 Claims, 6 Drawing Sheets

U.S. PATENT DOCUMENTS

| | | | |
|---|---|---|---|
| 6,831,951 | B2 | 12/2004 | Yamada |
| 7,242,717 | B2 | 7/2007 | Li et al. |
| 2002/0009143 | A1 | 1/2002 | Arye |
| 2002/0154693 | A1 | 10/2002 | Demos et al. |
| 2003/0044076 | A1 | 3/2003 | Mitchell et al. |
| 2004/0190770 | A1 * | 9/2004 | Spaulding et al. ............ 382/167 |
| 2004/0218678 | A1 | 11/2004 | Tardif |
| 2005/0013373 | A1 | 1/2005 | Lin et al. |
| 2008/0019449 | A1 | 1/2008 | Lin et al. |

OTHER PUBLICATIONS

Printouts of FTP directories from http://ftp3.itu.ch , 8 pp. (downloaded from the World Wide Web on Sep. 20, 2005.).

Aaron, "Wyner-Ziv Coding of Motion Video," Information Systems Laboratory Stanford University, 11 pp. (last modified Nov. 7, 2002).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

* cited by examiner

Software 180 implementing video encoder and/or decoder with flexible range reduction

| ENTRYPOINT LAYER( ) { | # bits | Descriptor |
|---|---|---|
| BROKEN_LINK | 1 | uimsbf |
| CLOSED_ENTRY | 1 | uimsbf |
| . . . | | |
| RANGE_MAPY_FLAG | 1 | uimsbf |
| if (RANGE_MAPY_FLAG == 1) { | | |
|    RANGE_MAPY | 3 | uimsbf |
| } | | |
| RANGE_MAPUV_FLAG | 1 | uimsbf |
| if (RANGE_MAPUV_FLAG == 1) { | | |
|    RANGE_MAPUV | 3 | uimsbf |
| } | | |
| } | | |

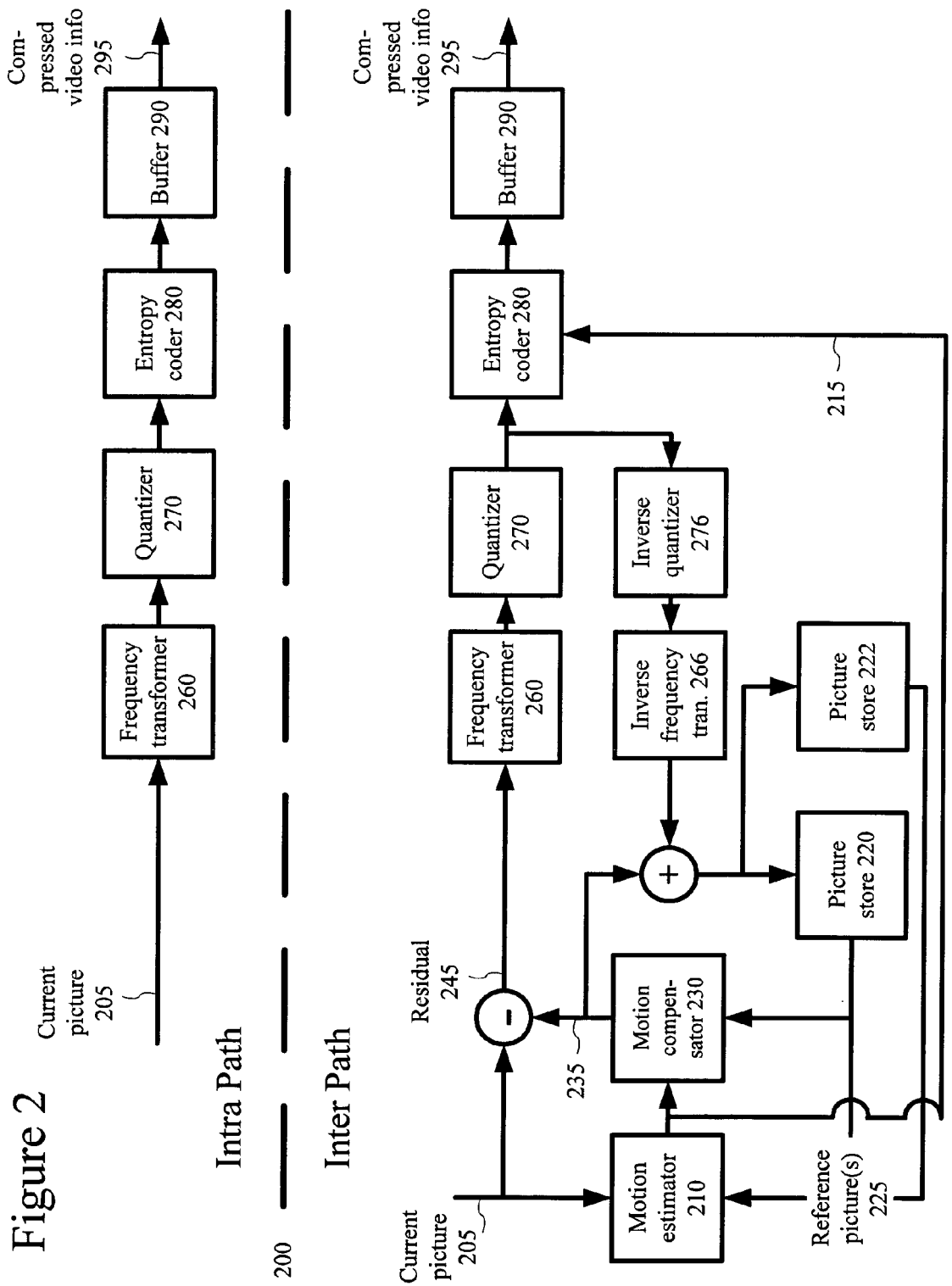

FLEXIBLE RANGE REDUCTION

RELATED APPLICATION INFORMATION

This application is a continuation-in-part of U.S. patent application Ser. No. 10/933,907, filed Sep. 2, 2004, which claims the benefit of U.S. Provisional Patent Application No. 60/501,081, filed Sep. 7, 2003. U.S. patent application Ser. No. 10/933,907 is also a continuation-in-part of U.S. patent application Ser. No. 10/857,473, filed May 27, 2004, which claims the benefit of U.S. Provisional Patent Application No. 60/501,081, filed Sep. 7, 2003. The disclosures of U.S. patent application Ser. Nos. 10/857,473 and 10/933,907 and U.S. Provisional Patent Application Ser. No. 60/501,081 are hereby incorporated by reference.

TECHNICAL FIELD

Techniques and tools are described for flexible range reduction of video samples.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Pixels of greater color depth can be represented by three samples totaling 48 bits or more. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. Intra-picture compression techniques compress individual pictures (typically called I-pictures or key pictures), and inter-picture compression techniques compress pictures (typically called predicted pictures, P-pictures, or B-pictures) with reference to one or more other pictures (typically called reference or anchor pictures).

A frame (or other video picture) is typically represented as one or more arrays of pixel samples. For example, a YUV video data frame is represented as three planes of samples: a luma (Y) plane of luma samples and two chroma (U, V) planes of chroma samples.

Often in inter-picture compression, motion compensation is used to exploit temporal redundancy between pictures. To exploit spatial redundancy in intra-picture compression, blocks of pixel or spatial domain video data are transformed into frequency domain (i.e., spectral) data. The resulting blocks of spectral coefficients may be quantized and entropy encoded. When the video is decompressed, a decoder typically performs the inverse of various compression operations (e.g., performs entropy decoding, inverse quantization, and an inverse transform) as well as motion compensation.

Numerous companies have produced video codecs. For example, Microsoft Corporation has produced a video encoder and decoder released for Windows Media Video 8. Aside from these products, numerous international standards specify aspects of video decoders and formats for compressed video information. These standards include the H.261, MPEG-1, H.262, H.263, MPEG-4, and JVT/AVC standards. Directly or by implication, these standards also specify certain encoder details, but other encoder details are not specified. These products and standards use (or support the use of) different combinations of compression and decompression techniques. In particular, these products and standards offer various techniques to trade-off quality and bit rate for video, including adjusting quantization, adjusting resolution (i.e., dimensions) of pictures, and frame dropping (i.e., temporal scalability).

While the compression techniques implemented in these products (or in compliance with these standards) are effective in many scenarios, it may be desirable to compress video data further than is allowable by a particular compression technique. For example, an upper limit on a quantization factor may limit the amount of compression that can be achieved by quantization. Moreover, in practice, extreme forms of quality degradation associated with particular techniques often limit how far video data may be effectively compressed with those techniques. For example, large quantization step sizes often result in visible distortions such as blocking or ringing in displayed images. Excessive frame dropping typically leads to choppy video on playback.

Microsoft Corporation has also produced a video encoder and decoder released for Windows Media Video 9 ["WMV9"]. In the WMV9 encoder and decoder, range reduction can provide for additional compression and/or help limit extreme forms of quality degradation for progressive video frames. The use of range reduction is signaled by a combination of sequence-layer and frame-layer bitstream elements.

A sequence header contains sequence-level parameters used in decoding a sequence of frames. In particular, the element PREPROC in the sequence-layer header is a one-bit element that indicates whether range reduction is used for the sequence. If PREPROC=0, range reduction is not used for any frame in the sequence. If PREPROC=1, there is a one-bit range reduction flag PREPROCFRM in the frame header for each progressive frame in the sequence. If PREPROCFRM=0 for a frame, range reduction is not used for the frame. If PREPROCFRM=1, range reduction is used for the frame.

When PREPROCFRM signals that range reduction is used for a frame, then the decoder scales up the reconstructed frame prior to display. The decoder also stores intact the actual reconstructed frame that has not been scaled up in value, for possible use in future motion compensation. A frame is represented using samples in the Y, U, and V planes within the range of 0 to 255 per sample. When, range reduction has been used for a frame, samples have been scaled down by a factor of two and mapped to a range of 64 to 191. The decoder thus scales up each of the samples in the Y, U, and V planes according to the following formulas:

$$Y[n]=\text{CLIP}(((Yr[n]-128)<<1)+128) \quad (1),$$

$$U[n]=\text{CLIP}(((Ur[n]-128)<<1)+128) \quad (2), \text{ and}$$

$$V[n]=\text{CLIP}(((Vr[n]-128)<<1)+128) \quad (3),$$

where $Yr[n]$, $Ur[n]$, and $Vr[n]$ represent the range-reduced values of the samples at different locations in the Y, U, and V planes, respectively. $Y[n]$, $U[n]$, and $V[n]$ represent the scaled up values of the samples in the Y, U, and V planes, respectively. $\text{CLIP}(n)$ equals 255 if $n>255$ and 0 if $n<0$; otherwise, $\text{CLIP}(n)$ equals n. The operator $<<x$ is a bitwise operator for a left shift by x bits with zero fill. The same scaling parameter (namely, a scaling factor of 2) is applied to the luma and chroma components of a frame.

When a reference frame is used for motion compensation, the decoder may scale it prior to using it for motion compensation. This is done when the current frame and the reference frame are operating at different ranges. More specifically, there are two cases that involve scaling the reference frame. First, if the current frame is range reduced but the reference frame is not, the decoder scales down the reference frame prior to motion compensation as follows:

$$Yr[n]=((Y[n]-128)>>1)+128 \quad (4),$$

$$Ur[n]=((U[n]-128)>>1)+128 \quad (5), \text{ and}$$

$$Vr[n]=((V[n]-128)>>1)+128 \quad (6),$$

where the operator $>>x$ is a bitwise operator for shift right by x bits with sign extension. Second, if the current frame is not range reduced but the reference frame is, the decoder scales up the reference frame prior to motion compensation, per equations (1) to (3).

While the preceding discussion focuses on syntax and decoder-side processing, the encoder-side processing is similar. An encoder scales down samples of a frame when range reduction is used for the frame, per equations (4) to (6). When a reference frame is used for motion compensation, the encoder scales it prior to motion compensation as necessary, as described for the decoder. The encoder signals the bitstream elements described above to regulate the use of range reduction.

While range reduction in WMV9 is effective in many cases, there is room for improvement for certain scenarios and types of content. The range reduction only allows scaling by a factor of 2 relative to the original sample depth—scaling by other factors or a choice of factors is not supported. This limits the granularity with which bit rate and quality can be regulated with the range reduction. Moreover, the range reduction is either (a) used for both luma and chroma samples or (b) not used at all. Performing range reduction for just luma (but not chroma) or just chroma (but not luma) is not supported, which again limits the usefulness of the range reduction in many scenarios. The range reduction uses per frame signaling, which can be inefficient in terms of bit rate. Finally, the range reduction at times involves scaling operations within the motion compensation loop, requiring additional encoder-side and decoder-side processing of reference frames.

Given the critical importance of compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for flexible range reduction. The described techniques and tools include, but are not limited to, the following:

A tool such as a video encoder signals one or more syntax elements for range reduction of luma samples and signals one or more syntax elements for range reduction of chroma samples. The tool may then selectively scale down the luma samples and selectively scale down the chroma samples.

Or, a tool such as a video decoder parses one or more syntax elements for range reduction of luma samples and parses one or more syntax elements for range reduction of chroma samples. The tool may then selectively scale up the luma samples and selectively scale up the chroma samples.

Or, a tool such as a video encoder signals one or more range reduction syntax elements in an entry point header for an entry point segment. The syntax element(s) apply to multiple pictures in the entry point segment. If range reduction is used for the pictures, the tool scales down samples of the pictures. Otherwise, the tool skips the scaling down.

Or, a tool such as a video decoder parses one or more range reduction syntax elements in an entry point header for an entry point segment. The syntax element(s) apply to multiple pictures in the entry point segment. If range reduction is used for the pictures, the tool scales up samples of the pictures. Otherwise, the tool skips the scaling up.

Or, a tool such a video encoder or video decoder determines a scaling factor from among multiple available scaling factors. The tool scales samples by the scaling factor to map between a smaller range and a larger range for the samples.

The various techniques and tools can be used in combination or independently.

Additional features and advantages will be made apparent from the following detailed description of different embodiments that proceeds with reference to the accompanying drawings.

BRIEF DESCRIPTION OF THE FIGURES

FIGS. 2 and 3 are block diagrams of generalized video encoder and decoder systems, respectively, in conjunction with which several described embodiments may be implemented.

DETAILED DESCRIPTION

The present application relates to techniques and tools for range reduction of video samples at the encoder side and decoder side, as well as techniques and tools for forming and parsing bitstreams that include such video.

The various techniques and tools can be used in combination or independently. Different embodiments implement one or more of the described techniques and tools. The techniques and tools described herein can be used in a video encoder or decoder, or in some other system not designed for video encoding or decoding.

I. Computing Environment

Figures 1, 9B:
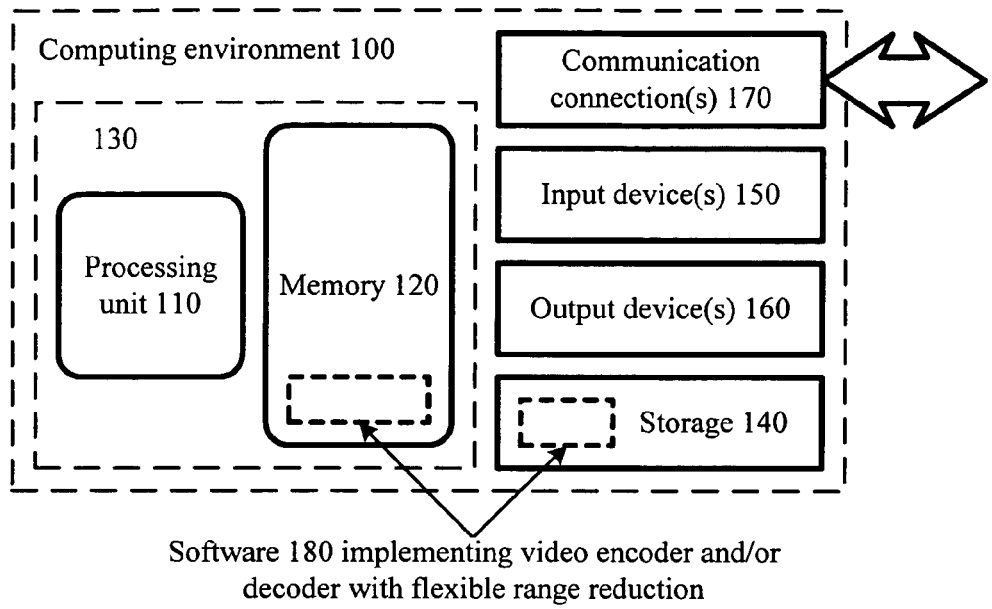
FIG. 1 is a block diagram of a suitable computing environment in which several described embodiments may be implemented.
FIG. 9B is a corresponding table.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing a video encoder and/or decoder with flexible range reduction.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "signal," "determine," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 3:
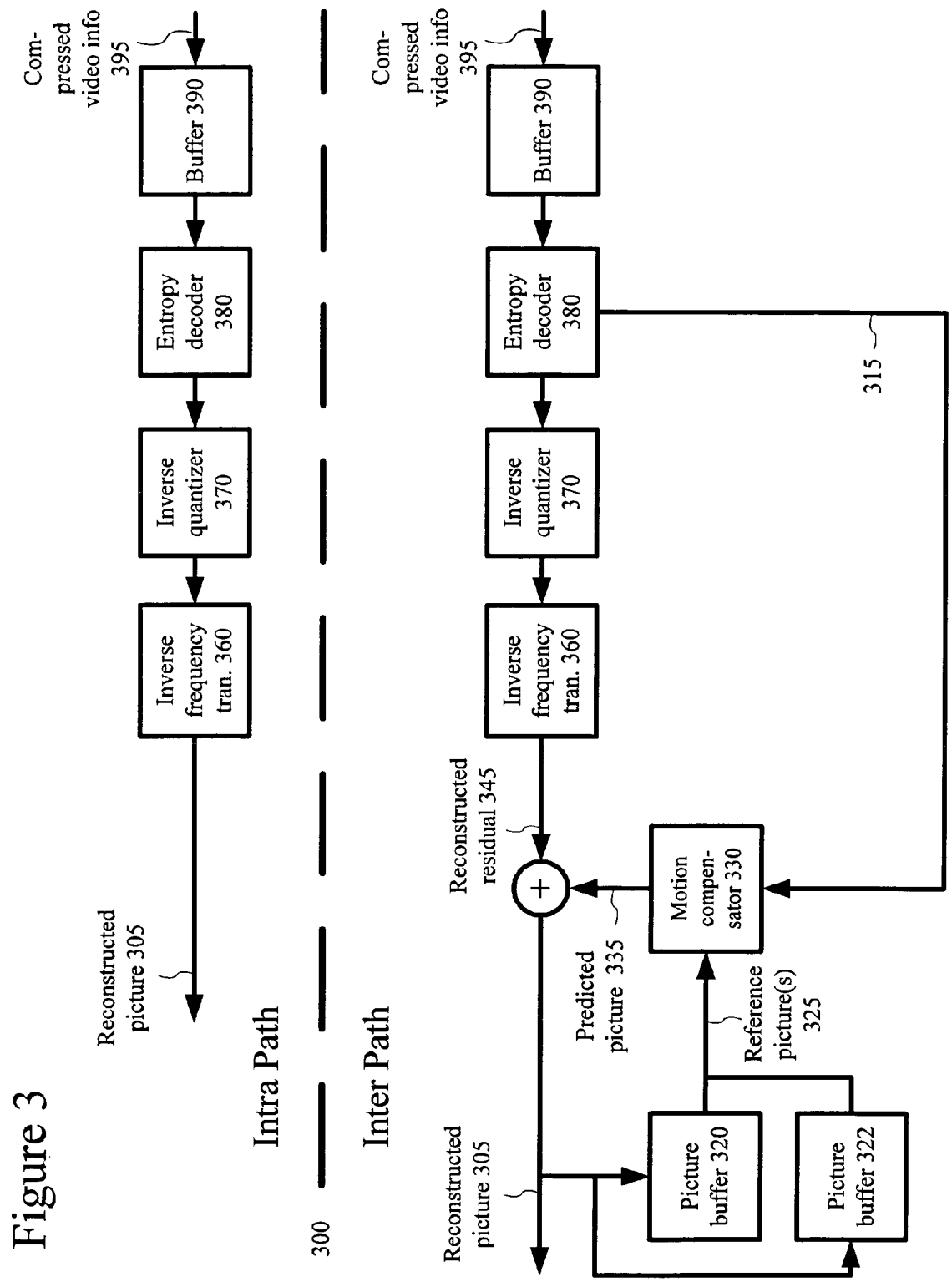

FIG. 2 is a block diagram of a generalized video encoder system (200), and FIG. 3 is a block diagram of a generalized video decoder system (300), in conjunction with which various described embodiments may be implemented.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (200) and decoder (300) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (200) and decoder (300) are block-based and use a 4:2:0 macroblock format for frames, with each macroblock including four 8×8 luma blocks (at times treated as one 16×16 macroblock) and two 8×8 chroma blocks. For fields, the same or a different macroblock organization and format may be used. Example video frame organizations are described in the next section.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (200) and decoder (300) process video frames organized as follows. A frame contains lines of spatial information of a video signal. For progressive video, these lines contain samples starting from one time instant and continuing through successive lines to the bottom of the frame. A progressive video frame is divided into macroblocks in conventional 4:2:0 macroblock format. Such a macroblock includes four 8×8 luma blocks (Y1 through Y4) and two 8×8 chroma blocks that are co-located with the four luma blocks but half resolution horizontally and vertically. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Interlaced video is commonly used in digital video broadcasting systems, whether over cable, satellite, or DSL. An interlaced video frame consists of two scans of a frame—one comprising the even lines of the frame (the top field) and the other comprising the odd lines of the frame (the bottom field). The two fields may represent two different time periods or they may be from the same time period.

An interlaced video frame may be organized for encoding/decoding as a frame. Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks.

Or, an interlaced video frame may be organized for encoding/decoding as fields. An interlaced I-field is a single, separately represented intra-coded field of an interlaced video frame. An interlaced P-field is a single, separately represented field coded using forward prediction, and an interlaced B-field is a single, separately represented field coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder (200) and decoder (300) are object-based, use a different macroblock or block format, or perform operations on sets of pixels of different size or configuration than 8×8 blocks and 16×16 macroblocks.

B. Video Encoder

FIG. 2 is a block diagram of a generalized video encoder system (200). The encoder system (200) receives a sequence of video pictures including a current picture (205) (e.g., progressive video frame, interlaced video frame, or field of an interlaced video frame), and produces compressed video information (295) as output. Particular embodiments of video encoders typically use a variation or supplemented version of the generalized encoder (200).

The encoder system (200) compresses predicted pictures and key pictures. For the sake of presentation, FIG. 2 shows a path for key pictures through the encoder system (200) and a path for forward-predicted pictures. Many of the components of the encoder system (200) are used for compressing both key pictures and predicted pictures. The exact operations performed by those components can vary depending on the type of information being compressed.

A predicted picture (also called P-picture, B-picture for bi-directional prediction, or inter-coded picture) is represented in terms of prediction (or difference) from one or more other pictures. A prediction residual is the difference between what was predicted and the original picture. In contrast, a key picture (also called an I-picture or intra-coded picture) is compressed without reference to other pictures.

If the current picture (205) is a forward-predicted picture, a motion estimator (210) estimates motion of macroblocks or other sets of pixels of the current picture (205) with respect to a reference picture, which is a reconstructed previous picture (225) buffered in the picture store (220). In alternative embodiments, the reference picture is a later picture or the current picture is bi-directionally predicted. The motion estimator (210) can estimate motion by pixel, ½-pixel, ¼-pixel, or other increments, and can switch the precision of the motion estimation on a picture-by-picture basis or other basis. The precision of the motion estimation can be the same or different horizontally and vertically. The motion estimator (210) outputs as side information motion information (215) such as motion vectors. A motion compensator (230) applies the motion information (215) to the reconstructed previous picture (225) to form a motion-compensated current picture (235). The prediction is rarely perfect, however, and the difference between the motion-compensated current picture (235) and the original current picture (205) is the prediction residual (245). Alternatively, a motion estimator and motion compensator apply another type of motion estimation/compensation.

A frequency transformer (260) converts the spatial domain video information into frequency domain (i.e., spectral) data. For block-based video pictures, the frequency transformer (260) applies a DCT or variant of DCT to blocks of the pixel data or prediction residual data, producing blocks of DCT coefficients. Alternatively, the frequency transformer (260) applies another conventional frequency transform such as a Fourier transform or uses wavelet or subband analysis. The frequency transformer (260) applies an 8×8, 8×4, 4×8, or other size frequency transform (e.g., DCT) to prediction residuals for predicted pictures.

A quantizer (270) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization. In addition to adaptive quantization, the encoder (200) can use frame dropping, adaptive filtering, or other techniques for rate control.

If a given macroblock in a predicted picture has no information of certain types (e.g., no motion information for the macroblock and no residual information), the encoder (200) may encode the macroblock as a skipped macroblock. If so, the encoder signals the skipped macroblock in the output bitstream of compressed video information (295).

When a reconstructed current picture is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted picture) or reconstructed samples (for an intra-coded picture). If the picture (205) being encoded is an intra-coded picture, then the reconstructed samples form the reconstructed current picture (not shown). If the picture (205) being encoded is a predicted picture, reconstructed prediction residuals are added to the motion-compensated predictions (235) to form the reconstructed current picture. The picture store (220) buffers the reconstructed current picture for use in predicting a next picture. In some embodiments, the encoder applies a deblocking filter to adaptively smooth discontinuities between blocks.

The entropy coder (280) compresses the output of the quantizer (270) as well as certain side information (e.g., motion information (215), quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bit rate adaptive modules. The compressed video information (295) is depleted from the buffer (290) at a constant or relatively constant bit rate and stored for subsequent streaming at that bit rate. Therefore, the level of the buffer (290) is primarily a function of the entropy of the filtered, quantized video information, which affects the efficiency of the entropy coding. Alternatively, the encoder system (200) streams compressed video information immediately following compression, and the level of the buffer (290) also depends on the rate at which information is depleted from the buffer (290) for transmission.

Before or after the buffer (290), the compressed video information (295) can be channel coded for transmission over the network. The channel coding can apply error detection and correction data to the compressed video information (295).

C. Video Decoder

FIG. 3 is a block diagram of a generalized video decoder system (300). The decoder system (300) receives information (395) for a compressed sequence of video pictures and produces output including a reconstructed picture (305) (e.g., progressive video frame, interlaced video frame, or field of an interlaced video frame). Particular embodiments of video decoders typically use a variation or supplemented version of the generalized decoder (300).

The decoder system (300) decompresses predicted pictures and key pictures. For the sake of presentation, FIG. 3 shows a path for key pictures through the decoder system (300) and a path for forward-predicted pictures. Many of the components of the decoder system (300) are used for decompressing both key pictures and predicted pictures. The exact operations performed by those components can vary depending on the type of information being decompressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information (315), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the picture (305) to be reconstructed is a forward-predicted picture, a motion compensator (330) applies motion information (315) to a reference picture (325) to form a prediction (335) of the picture (305) being reconstructed. For example, the motion compensator (330) uses a macroblock motion vector to find a macroblock in the reference picture (325). A picture buffer (320) stores previous reconstructed pictures for use as reference pictures. The motion compensator (330) can compensate for motion at pixel, ½-pixel, ¼-pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (300) also reconstructs prediction residuals.

An inverse quantizer (370) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization.

An inverse frequency transformer (360) converts the quantized, frequency domain data into spatial domain video information. For block-based video pictures, the inverse frequency transformer (360) applies an IDCT or variant of IDCT to blocks of the DCT coefficients, producing pixel data or prediction residual data for key pictures or predicted pictures, respectively. Alternatively, the frequency transformer (360) applies another conventional inverse frequency transform such as a Fourier transform or uses wavelet or subband synthesis. The inverse frequency transformer (360) applies an 8×8, 8×4, 4×8, or other size inverse frequency transform (e.g., IDCT) to prediction residuals for predicted pictures.

When the decoder needs a reconstructed picture for subsequent motion compensation, the picture store (320) buffers the reconstructed picture for use in predicting a next picture. In some embodiments, the encoder applies a deblocking filter to adaptively smooth discontinuities between blocks.

III. Flexible Range Reduction

With range reduction, the dynamic range of samples in input video is reduced before compression. The dynamic range of the samples is scaled back up to its original range for output. Range reduction has numerous advantages.

Range reduction may be advantageous to further compress video beyond what is possible with quantization techniques in the transform domain. Standards and products often limit the highest quantization step size that can be used, thereby effectively limiting the amount of compression that can be achieved by quantization. However, by reducing the range of the luma and chroma samples in the spatial domain prior to a frequency transform, and also quantizing the frequency domain data after the transform, a lower bit rate can be achieved for a given quantizer step size.

Moreover, using range reduction in conjunction with transform domain quantization often achieves better overall subjective quality for a given bit rate than using transform domain quantization alone for that bit rate. This is especially true for very low bit rate applications, since the subjective quality of reconstructed video typically degrades dramatically at very low bit rates as large quantization step sizes are used for prediction errors, etc. Transform domain quantization often results in blocking artifacts and/or ringing artifacts when large step sizes are used. On the other hand, range reduction can produce posterization or banding artifacts. While none of these artifacts are desirable, a displayed frame typically looks better with a combination of slight posterization/banding and slight blocking/ringing than with severe blocking/ringing and no posterization/banding (or severe posterization/banding and no blocking/ringing). Range re-mapping helps to mitigate severe artifacts and achieve graceful degradation in overall subjective quality at low bit rates.

Thus, range reduction can allow a codec to use finer quantizers and still meet a target bit rate constraint. Suppose a codec allows a maximum quantization step size of 31. Using range reduction with a scaling factor of 2, the codec can match a target bit rate and provide better overall subjective quality than another codec that uses a quantization step size of 62 (but no range re-mapping) for output at that bit rate.

Before inverse range reduction at the decoder side, deblocking and/or deringing may be performed on reduced range pictures to mitigate blocking and/or ringing artifacts therein. Range reduction can help improve video quality in these cases.

Range reduction helps with bit rate control for high contrast video such as palletized video and ticker symbols. And, for video having a sample depth higher than the highest bit depth supported by a codec, range reduction can be used to reduce samples to a supported depth before encoding, then restore the samples to their original depth after decoding. For example, 12-bit per sample video may be reduced to 8-bit per sample video before encoding then restored to 12-bit per sample video after decoding.

Range reduction integrates well with the lossy phases of a codec. It is believed that the variance, energy, and other properties of a range-reduced picture provide better results in the lossy phases than would be produced by other operations, such as rounding the samples of a picture to the nearest even or odd number within the original range.

Various low complexity implementations are described below. Low complexity is particularly important at the decoder-side, where division-free operations are used in some implementations, and where multiplication-free operations are possible as well for certain scaling factors in some implementations.

At the encoder side and/or decoder side, scaling operations for range re-mapping may be implemented according to linear scaling equations or other linear mapping rules. Or, scaling operations may be implemented by look-up table(s) or other non-linear mapping rules. Similarly, a scaling factor may be a parameter in a linear scaling equation. Or, a scaling factor may indicate a particular look-up table for range re-mapping, or it may otherwise indicate linear or non-linear rules for range re-mapping.

In some embodiments, range reduction uses different scaling factors for luma and chroma components of video. This provides additional flexibility in how range reduction is used. For example, it allows an encoder to use range reduction for the chroma plane of a video picture but not use range reduction for the luma plane of the video picture, or vice versa. In other embodiments, range reduction uses the same scaling factor for luma and chroma components of video when used for the video.

In some embodiments, range reduction uses any of a range of available scaling factors. This again provides additional flexibility in how range reduction is used. For example, it allows an encoder to use more drastic range reduction for some samples and less drastic range reduction for other samples. In other embodiments, range reduction uses a single scaling factor (e.g., scaling down and up by a factor of 2).

In some embodiments, an encoder and decoder operate in conjunction with entry point signaling of range reduction parameters. Use of range reduction for the picture(s) in an entry point segment is signaled with an on/off flag in the entry point header. When appropriate (e.g., when a choice of scaling factors is supported and range reduction is to be used), a range reduction parameter indicating a particular scaling factor is also signaled in the entry point header. In this way, the bit rate associated with range reduction signaling is reduced compared to frame-by-frame signaling, at the expense of reduced temporal adaptability. In other embodiments, an encoder and decoder operate in conjunction with another signaling mechanism, for example, one that signals range reduction on/off and/or scaling factors on a picture-by-picture or other basis. Or, the signaling mechanism signals range reduction on/off and/or scaling factors for a group of pictures but the signaling is not in an entry point header. For example, the range reduction parameter(s) are signaled for an I-frame and, by rule, also apply to any intermediate P- and B-frames up to the next I-frame.

In some embodiments, range reduction is performed outside of the motion compensation loop of an encoder and decoder. For example, samples are scaled down before encoding then scaled up again after decoding, with no intermediate range reduction processing on reference pictures for motion estimation or compensation. This reduces the computational cost of range reduction. In other embodiments, range reduction is performed within the motion compensation loop of an encoder and decoder.

A. Separate Range Reduction Parameters for Luma and Chroma

In some embodiments, a decoder such as the decoder (300) in FIG. 3 uses separate range reduction parameters for luma samples and chroma samples. For example, the decoder implements the technique (400) shown in FIG. 4.

From a bitstream, the decoder parses (410) one or more syntax elements for range reduction of luma samples. For example, the decoder parses (410) an on/off flag and (if range reduction is on) a scaling factor parameter in an entry point header. Alternatively, the decoder parses (410) different syntax elements and/or parses syntax elements on a sequence-by-sequence, picture-by-picture, slice-by-slice, or other basis. Similarly, the decoder parses (420) one or more other syntax elements for range reduction of chroma samples.

Based at least in part on the parsed luma range reduction syntax elements, the decoder selectively scales up (430) the luma samples. For example, when range reduction has been used on the luma samples, the decoder scales up the luma samples by a signaled scaling factor or a pre-defined scaling factor. Similarly, the decoder selectively scales up (440) the chroma samples based at least in part on the parsed chroma range reduction syntax elements.

Figure 4:
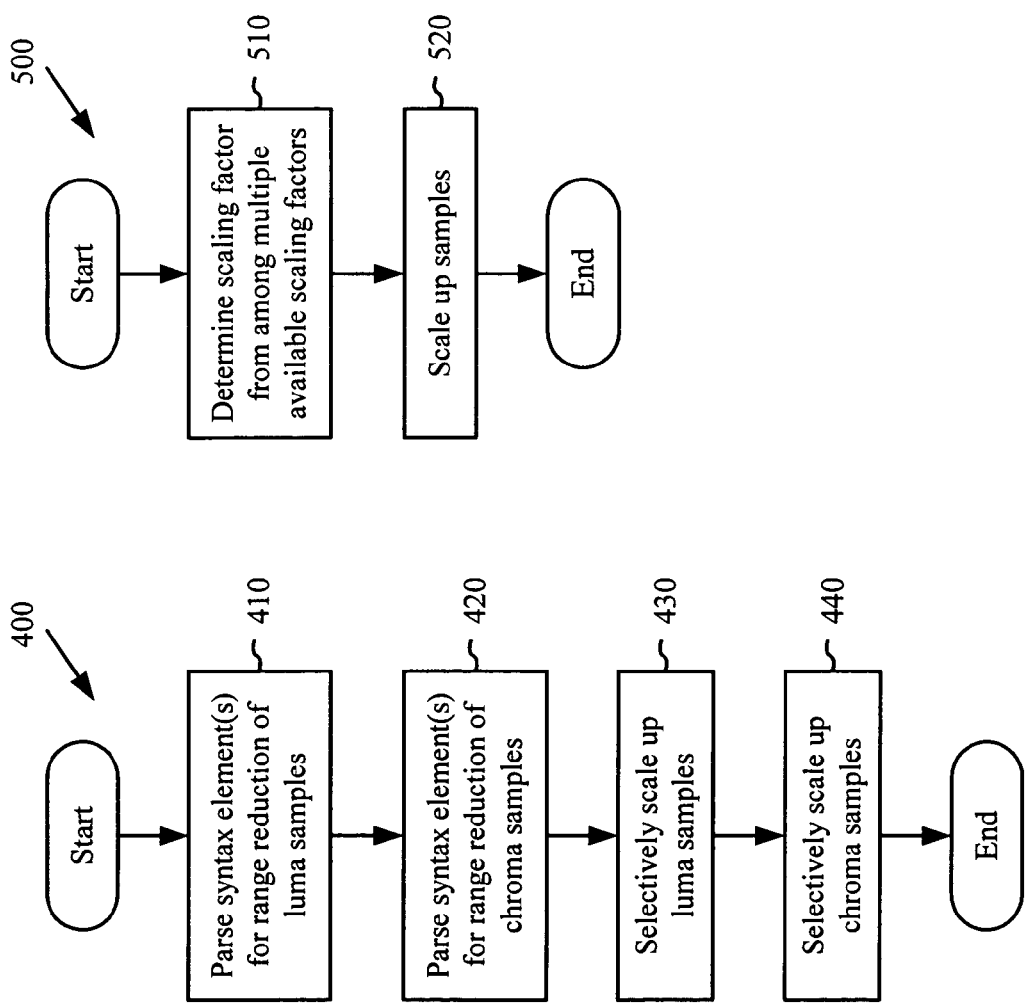

For the sake of simplicity, FIG. 4 does not show how the technique (400) relates to other aspects of range reduction, encoding and decoding. An encoder such as the encoder (200) shown in FIG. 2 performs a corresponding technique (not shown). For example, the encoder selectively performs scale down operations that mirror the selective scale up operations in the decoder. The encoder signals syntax elements in ways that mirror the parsing operations in the decoder.

B. Multiple Possible Scaling Factors

In some embodiments, a decoder such as the decoder (300) in FIG. 3 uses any of multiple possible scaling factors. For example, the decoder implements the technique (500) shown in FIG. 5.

The decoder determines (510) a scaling factor from among multiple available scaling factors. For example, the decoder parses a syntax element from a bitstream, where the syntax element indicates the scaling factor. Alternatively, the decoder determines (510) the scaling factor from among multiple available scaling factors based upon contextual information or with another mechanism. The decoder may determine (510) a scaling factor per entry point segment or on some other basis. The decoder then scales up (520) samples according to the scaling factor.

Figure 5:
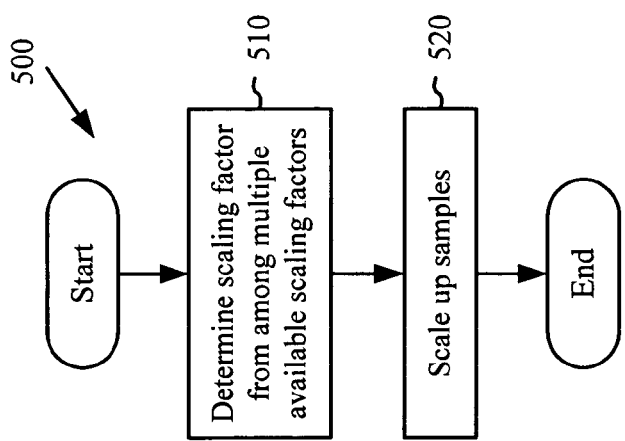

For the sake of simplicity, FIG. 5 does not show how the technique (500) relates to other aspects of range reduction, encoding and decoding. An encoder such as the encoder (200) shown in FIG. 2 performs a corresponding technique (not shown). For example, the encoder performs scale down operations that mirror the scale up operations in the decoder. The encoder also determines the scaling factor but, unlike the decoder, does this by evaluating which scaling factor (if any) to use with an open-loop or closed-loop evaluation process, as described in section III.D.

C. Signaling Range Reduction for Entry Point Segments

In some embodiments, a decoder such as the decoder (300) in FIG. 3 works with an encoder that signals range reduction information for entry point segments. For example, the decoder implements the technique (600) shown in FIG. 6.

From a bitstream, the decoder parses (610) one or more syntax elements in an entry point header for an entry point segment. For example, the decoder parses (610) syntax elements for luma range reduction and chroma range reduction in the entry point header. Alternatively, the decoder parses (610) different syntax elements.

Based at least in part on the parsed syntax elements, the decoder selectively scales up (620) the samples of the one or more pictures in the entry point segment. For example, when range reduction has been used on the samples, the decoder scales up the samples by a signaled scaling factor or a pre-defined scaling factor. Thus, the range reduction parameter(s) (e.g., on/off decisions and scaling factors) signaled in an entry point header apply to all of the pictures that follow, until the next entry point header.

Figure 6:
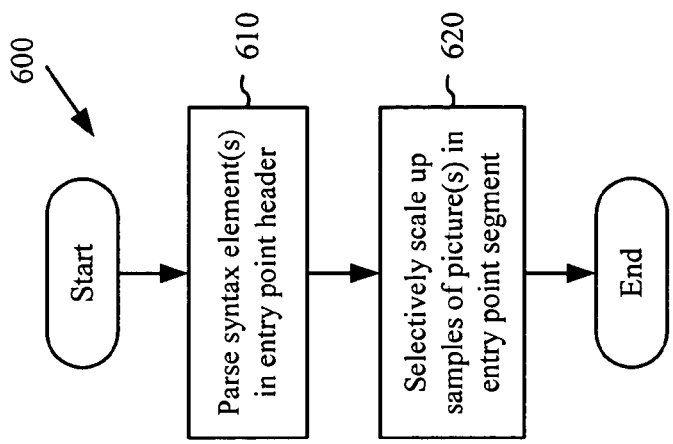
FIGS. 4, 5, and 6 are flowcharts for range reduction techniques at the decoder-side.

For the sake of simplicity, FIG. 6 does not show how the technique (600) relates to other aspects of range reduction, encoding and decoding. An encoder such as the encoder (200) shown in FIG. 2 performs a corresponding technique (not shown). For example, the encoder selectively performs scale down operations that mirror the selective scale up operations in the decoder. The encoder signals syntax elements in ways that mirror the parsing operations in the decoder.

D. Example Encoder Framework

Figure 7:
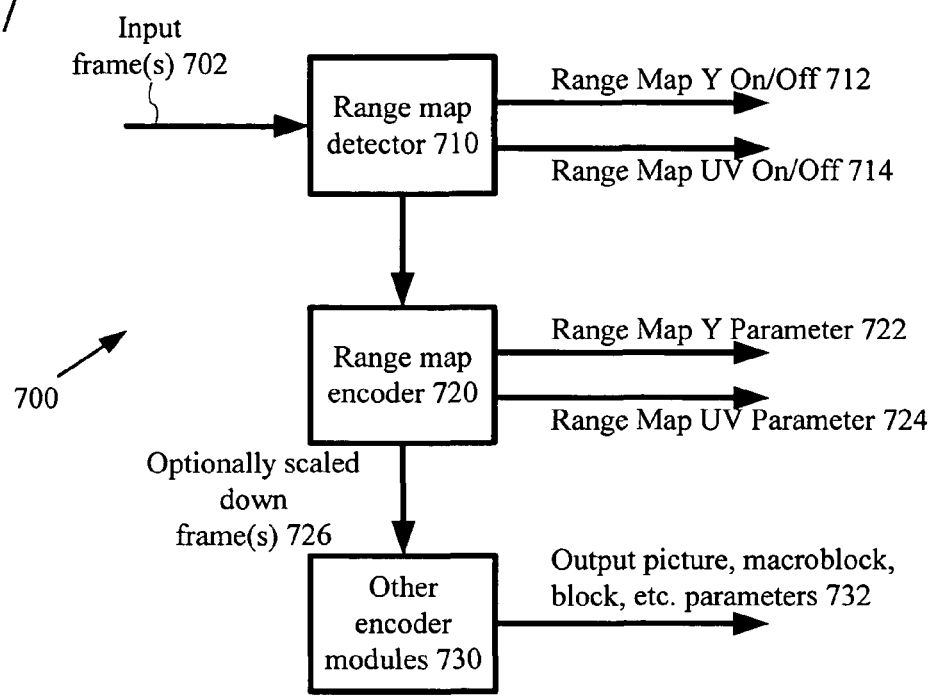
FIGS. 7 and 8 are block diagrams of range reduction frameworks at the encoder-side and decoder-side, respectively.

FIG. 7 shows an encoder-side framework (700) for flexible range re-mapping. Although FIG. 7 shows various separate range reduction modules, these modules may instead be combined or separated into still other modules in different implementations.

The range map detector (710) accepts one or more input video frames (702) (e.g., progressive or interlaced frames for an entry point segment). Based on the content of the video and/or the target bit rate, the range map detector (710) determines if the dynamic range of the input frame(s) (702) should be scaled down for compression. In FIG. 7, the detector (710) makes this determination independently for luma samples and chroma samples of the frame(s) (702), and signals separate range mapping on/off parameters (712, 714) for the luma samples and the chroma samples of the frame(s) (702). Range mapping can be used on either the luma samples or the chroma samples or both. For example, the detector (710) uses range mapping for only chroma samples if the target bit rate is in a first bit rate range, uses range mapping for only luma samples if the target bit rate is in a second bit rate range lower than the first, and uses range mapping for both luma samples and chroma samples if the target bit rate is lower than a very low bit rate threshold. The detector (710) may consider content characteristics (e.g., no motion, low motion, high motion, low detail, high detail). The detector (710) is more likely to use range mapping when the artifacts introduced by range mapping (e.g., posterization, banding) are less likely to be noticed (e.g., for low detail, high motion video). Conversely, the detector (710) is less likely to use range mapping when such artifacts are more likely to be noticed (e.g., for no motion, high detail video).

If range mapping is to be used, the range map encoder (720) determines one or more appropriate scaling factors, signals range reduction parameters for the scaling factors, and selectively performs scale down operations. The same or different parameters can be used for luma samples and chroma samples. In FIG. 7, the range map encoder (720) makes this determination independently for luma samples and chroma samples of the frame(s) (702) and signals separate parameters (722, 724) for the luma samples and chroma samples. For example, the range map encoder (720) considers the bit rate and/or content factors described above, increasing the scaling factor to lower output bit rate and/or when doing so is expected to be relatively imperceptible. Alternatively, the range map encoder (720) uses another open-loop estimation mechanism to select the scaling factor(s). Or, the range map encoder (720) uses a closed-loop evaluation mechanism to evaluate actual performance with different scaling factors in terms in bit rate and/or quality.

Parameterization and scaling operations in encoder-side range mapping depend on implementation. In general, for a given decoder-side range mapping scheme, an encoder is free to use any of several different range reduction schemes that are consistent with that decoder scheme. In other words, even if decoder-side range reduction behavior is constrained for the sake of interoperability or compliance with a standard, an encoder has some degree of flexibility in how it performs range reduction.

An encoder-side range reduction scheme can be chosen to match the computational capabilities of the encoding device. For example, to speed up encoder-side processing (at some cost to precision), the encoder may perform more aggressive truncation or rounding operations. Or, rather than compute results according to equations that map input values to range-reduced values, an encoder may use one or more look-up tables, with different lookup tables being used for different scaling factors. More generally, apart from linear scaling operations (such as those embodied in equations (7) to (9) below), an encoder may use pre-determined non-linear mapping rules (such as those embodied in look-up tables), and these rules can be indicated with the same syntax as linear scaling operations (e.g., using signaled scaling factor parameters for rule or table selection).

In one implementation, a range mapping parameter is an integer in the range of 0 to 7. Samples of an input frame are then scaled down as follows.

$$Yr(n)=nint((Y(n)-128)*8/(Ry+9)+128) \quad (7),$$

$$Ur(n)=nint((U(n)-128)*8/(Ruv+9)+128) \quad (8), \text{ and}$$

$$Vr(n)=nint((V(n)-128)*8/(Ruv+9)+128) \quad (9),$$

where Ry and Ruv are the range mapping parameters for luma and chroma, respectively. Y(n), U(n) and V(n) are the values of the $n^{th}$ sample of the luma and chroma components of a frame, and Yr(n), Ur(n) and Vr(n) are the corresponding range-reduced samples. The operator nint (x) returns the nearest integer value to a floating point value x, where half-integer values are rounded away from zero. In this implementation, the maximum scaling that can be achieved (at value of Ry=7 or Ruv=7) is a factor of 2.

The following table shows example range-reduced values for different sample inputs and scaling factors.

| Input value | Range-reduced value, R = 0 | Range-reduced value, R = 3 | Range-reduced value, R = 7 |
| --- | --- | --- | --- |
| 0 | 14 | 43 | 64 |
| 1 | 15 | 43 | 65 |
| 2 | 16 | 44 | 65 |
| ... | ... | ... | ... |
| 127 | 127 | 127 | 128 |
| 128 | 128 | 128 | 128 |
| 129 | 129 | 129 | 129 |
| ... | ... | ... | ... |
| 254 | 240 | 212 | 191 |
| 255 | 241 | 213 | 192 |

Alternatively, larger values of scaling factors (e.g., up to a factor of 4 or more) are used and/or scaling factors of greater precision (e.g., signaled integer range of 0 to 15 or 0 to 31 for a given range of factors) are used. If so, the multipliers and divisors in the scaling equations may change accordingly. Or, a different input range may be used, potentially leading to a change in the offsets (+/−128) in the scaling equations if the different range has a different mid-point.

In another implementation, for range reduction in an encoder, luma samples of an input frame are scaled down as shown in the following pseudocode.

$cNew=Ry+9$ $cNewHalf=(cNew>>1);$ $Int\ iTmp=((Int)(Y[n])-128)*8;$ if $(iTmp>=0)$ $Yr[n]=(int)((iTmp+cNewHalf)/cNew+128);$ else $Yr[n]=(int)((iTmp+cNewHalf)/cNew+127);$ where Ry is again the range mapping parameter for luma. For chroma the pseudocode is analogous, but cNew=Ruv+9 and Y[n], Yr[n] are instead U[n], Ur[n] or V[n], Vr[n] as appropriate.

Various other encoder modules (730) (for example, modules shown in FIG. 2) accept the optionally scaled down frame(s) (726), encode them, and output a coded bitstream of parameters (732). As shown in FIG. 7, range reduction processing occurs before and independent of the main encoding of the video. Motion compensation is performed from scaled down reference pictures.

E. Example Decoder Framework

Figure 8:
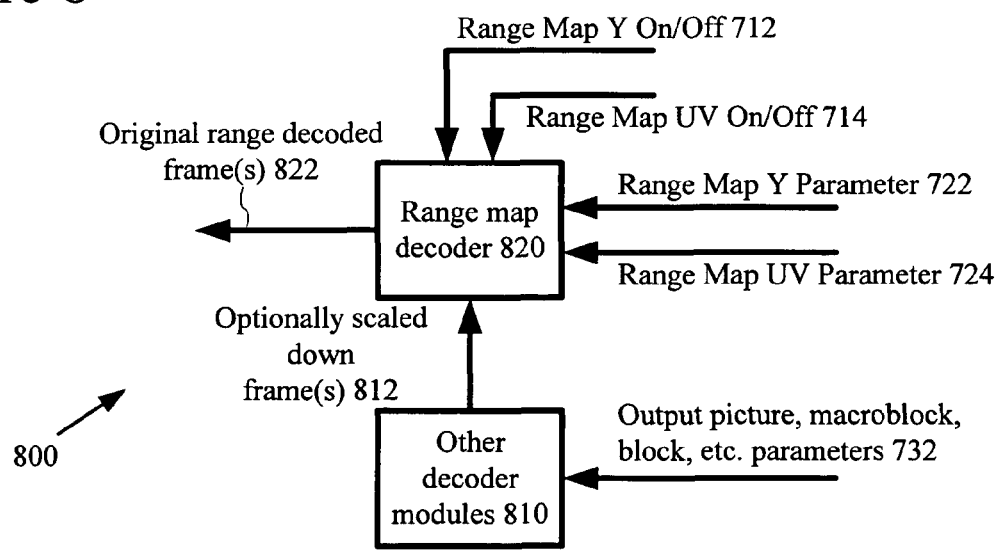

FIG. 8 shows a corresponding decoder-side framework (800) for flexible range re-mapping. Although FIG. 8 shows a single range reduction module, this module may instead be separated into different modules in different implementations.

Various decoder modules (810) (for example, modules shown in FIG. 3) accept the coded bitstream of parameters (732), decode the optionally scaled down frame(s), and output the decoded, optionally scaled down frame(s) (812). As shown in FIG. 8, range reduction processing occurs after and independent of the main decoding of the video. Motion compensation is performed from scaled down reference pictures, and the scaling up is outside the prediction loop. The various decoder modules (810) may include a deblocking filter and/or deringing filter, and scaling up operations for decoder-side range expansion may occur before or after such filtering. Thus, the deblocking and/or deringing (or other post-processing), when used, can be performed on the original range reconstructed frames or on the reduced-range, reconstructed frames.

The range map decoder (820) accepts the decoded frame(s) (812) (e.g., progressive or interlaced frames for an entry point segment) as well as various range reduction control signals. If range mapping is used, the range map decoder (820) determines the appropriate range mapping parameters and selectively performs scale up operations. Again, the same or different parameters can be used for luma samples and chroma samples. In FIG. 8, for luma samples, the range map decoder (820) accepts the on/off flag (712). The range map decoder (820) also accepts an on/off flag (714) for chroma samples. The range map decoder (820) checks the respective on/off flags (712, 714) to see if a range mapping parameter (722 and/or 724) for a scaling factor has been transmitted in the bitstream. If so, the corresponding range parameter (722 and/or 724) is decoded, and the decoder performs scaling up operations.

Parameterization and scaling operations in decoder-side range mapping depend on implementation. Compared to encoder-side range mapping, however, decoder-side range mapping is much less flexible. Decoder-side range reduction behavior is typically constrained for the sake of interoperability and/or compliance with a standard. To some extent, a decoder-side range reduction scheme can be chosen to match the computational capabilities of the decoding device. For example, rather than compute results according to equations that map range-reduced values to reconstructed values, a decoder may use one or more look-up tables, with different lookup tables being used for different scaling factors. More generally, apart from linear scaling operations (such as those embodied in equations (10) to (12) below), a decoder may use pre-determined non-linear mapping rules (such as those embodied in look-up tables), and these rules can be indicated with the same syntax as linear scaling operations (e.g., using signaled scaling factor parameters for rule or table selection).

In one implementation, a range mapping parameter is an integer in the range of 0 to 7. After the other steps of decoding (including loop-filtering) have been performed, samples of a frame are scaled up as follows.

$$Y(n)=CLIP((((Yr(n)-128)*(Ry+9)+4)>>3)+128) \quad (10),$$

$$U(n)=CLIP((((Ur(n)-128)*(Ruv+9)+4)>>3)+128) \quad (11), \text{ and}$$

$$V(n)=CLIP((((Vr(n)-128)*(Ruv+9)+4)>>3)+128) \quad (12),$$

where >>x indicates a shift right with sign extension, and the CLIP operation clamps an output value to the range of 0 to 255. For some scaling factors (e.g., with Ry=7) in this implementation, decoder-side scaling operations are multiplication free (instead using shift operations), and are of low complexity. For all scaling factors in this implementation, the decoder-side scaling operations are low-complexity, division-free operations (since right shifts are used instead).

The following table shows example reconstructed values for different range-reduced values and scaling factors.

| Range-reduced value | Reconstructed value, R = 0 | Reconstructed value, R = 3 | Reconstructed value, R = 7 |
|---|---|---|---|
| 14 | 0 | n/a | n/a |
| 15 | 1 | n/a | n/a |
| ... | ... | ... | ... |
| 43 | 32 | 1 | n/a |
| 44 | 34 | 2 | n/a |
| ... | ... | ... | ... |
| 64 | 56 | 32 | 0 |
| 65 | 57 | 34 | 2 |
| ... | ... | ... | ... |
| 127 | 127 | 127 | 126 |
| 128 | 128 | 128 | 128 |
| 129 | 129 | 130 | 130 |
| ... | ... | ... | ... |
| 191 | 199 | 223 | 254 |
| 192 | 200 | 224 | 255 |
| ... | ... | ... | ... |
| 212 | 223 | 254 | n/a |
| 213 | 224 | 255 | n/a |
| ... | ... | ... | ... |
| 240 | 254 | n/a | n/a |
| 241 | 255 | n/a | n/a |

For example, with a R=7 (scaling factor of 2), a range-reduced value of 64 would yield a scaled up, reconstructed value of 0. 64-128 is -64 (or, in 16-bit binary, 1111111111000000). When multiplied by 16 (or left shifted by 4 with zero filling), this becomes 1111110000000000. Adding 4 results in 1111110000000100, and right shifting by 3 (with sign extension) yields 1111111110000000, or -128. Adding 128 to this number r results in 0. When the scaling factor is 2, the range-reduced values in the smaller range of 64 to 191 are mapped onto the larger range of 0 to 254 in steps of 2, and the range-reduced value of 192 maps to 255 after clipping.

For all of the scaling factors, an original sample value of 128 maps to a range-reduced reduced value of 128 and is reconstructed as 128. Keeping the midpoint of the ranges at 128 allows for re-use of various forms of prediction in the encoder and decoder that have a default predictor value of 128.

Alternatively, larger values of scaling factors (e.g., up to a factor of 4 or more) are used and/or scaling factors of greater precision (e.g., signaled integer range of 0 to 15 or 0 to 31 for a given range of factors) are used. If so, the multipliers in the scaling equations and the rounding offset (+4) may change accordingly, and the right shift operation may be replaced with a division by some appropriate divisor. Or, a different original range may be used, potentially leading to a change in the mid-point offsets (+/-128) in the scaling equations.

F. Combined Implementation

A detailed combined implementation for a bitstream syntax, semantics, and decoder using range reduction is now described. In the combined implementation, a compressed video sequence is made up of data structured into hierarchical layers: the picture layer, macroblock layer, and block layer. A sequence layer precedes the sequence, and entry point headers may be interspersed in the sequence.

A sequence-level header contains sequence-level parameters used to decode a sequence of compressed pictures. In some profiles, the sequence-related metadata is communicated to the decoder by the transport layer or other means. For another profile (the advanced profile), however, this header syntax is part of the video data bitstream. At the sequence layer, PROFILE and LEVEL elements specify the profile used to encode the sequence and the encoding level in the profile, respectively.

Figure 9A:
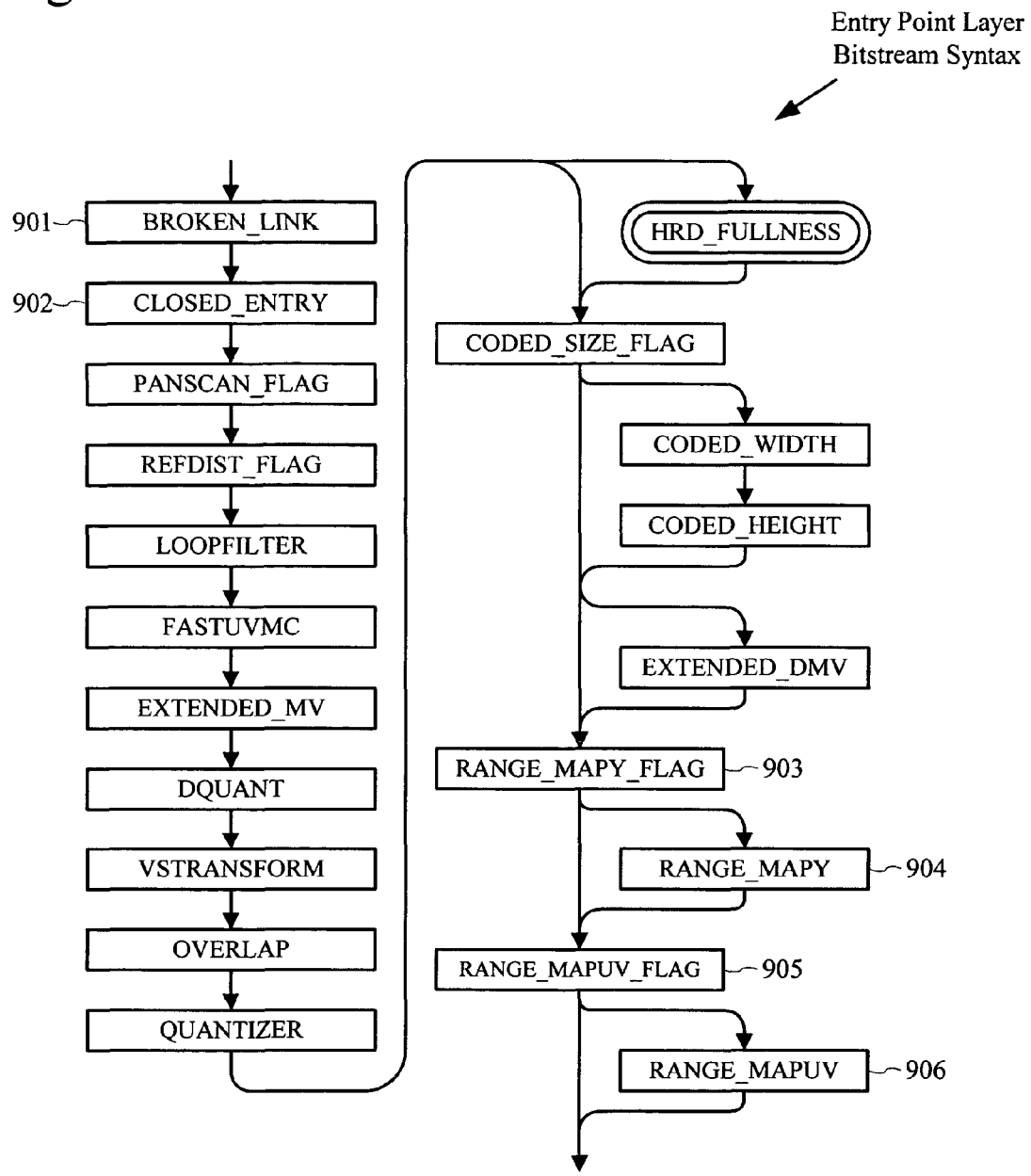
FIG. 9A is a syntax diagram for an entry point layer of a bitstream.

An entry point header may be present in the advanced profile. An entry point has two purposes. First, it is used to signal a random access point within the bitstream for a group of pictures. Subsequent pictures can be decoded starting from the entry point. Second, it is used to signal changes in the coding control parameters. An entry point header contains coding control parameters that are used to signal which compression tools are enabled for the entry point segment. FIG. 9A shows the syntax elements that make up the entry point layer, and FIG. 9B shows a corresponding syntax table.

CLOSED_ENTRY (902) is a one-bit syntax element. CLOSED_ENTRY=1 indicates that the current entry point segment does not contain any B-pictures that require reference to an I- or P-picture in the previous entry point segment. CLOSED_ENTRY=0 indicates that the entry point segment may contain B-pictures that require reference to an I- or P-picture in the previous entry point segment. BROKEN_LINK (901) is also a one-bit syntax element. If CLOSED_ENTRY=1, then BROKEN_LINK (901) is undefined. If CLOSED_ENTRY=0, then BROKEN_LINK=0 indicates that the previous entry point segment required to decode any dependent B pictures is still present. BROKEN_LINK=1 indicates that the entry point contains B-pictures which require an I- or P-picture in the previous entry point, but the previous entry point is no longer present (usually because of an edit).

As for range reduction, the range mapping luma flag RANGE_MAPY_FLAG (903) is a one-bit syntax element. If RANGE_MAPY_FLAG=1, the range mapping luma syntax element RANGE_MAPY (904) is present within the entry point header. Otherwise, RANGE_MAPY (904) is absent. RANGE_MAPY (904) is a three-bit syntax element that takes a value from 0 to 7 (unsigned integer). If RANGE_MAPY (904) is present, the luma samples of the decoded pictures within the entry point segment are scaled according equation (10), using RANGE_MAPY (904) as Ry. This scaling is performed after all other decoding stages (including loop-filter) have been performed. If CLOSED_ENTRY=0, the values of RANGE_MAPY_FLAG (903) and RANGE_MAPY (904) are set to the values of the corresponding syntax elements in the previous entry point segment.

The range mapping chroma flag RANGE_MAPUV_FLAG (905) is another one-bit syntax element. If RANGE_MAPUV_FLAG=1, the range mapping chroma syntax element RANGE_MAPUV (906) is present within the entry point header. Otherwise, RANGE_MAPUV (906) is absent. RANGE_MAPUV (906) is another three-bit syntax that takes a value from 0 to 7 (unsigned integer). If RANGE_MAPUV (906) is present, the chroma samples of the decoded pictures within the entry point segment are scaled according to equations (11) and (12), using RANGE_MAPUV (906) as Ruv. Like the scaling of the luma samples, this scaling is performed after all other decoding stages (including loop-filter) have been performed. If CLOSED_ENTRY=0, the values of RANGE_MAPUV- _FLAG (905) and RANGE_MAPUV (906) are set to the values of the corresponding syntax elements in the previous entry point segment.

Syntax, semantics, and decoding for other layers of the bitstream (e.g., picture, slice, macroblock, block, sub-block) are described, for example, in U.S. Provisional Patent Application Ser. No. 60/501,081.

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

Various alternatives to the implementations described herein are possible. For example, techniques described with reference to flowchart diagrams can be altered by changing the ordering of stages shown in the flowcharts, by repeating or omitting certain stages, etc. As another example, in various embodiments, an encoder and decoder use flags and/or signals in a bitstream. While specific flags and signals are described, it should be understood that this manner of description encompasses different conventions (e.g., 0s rather than 1s) for the flags and signals.

In view of the many possible embodiments to which the principles of our invention may be applied, we claim as our invention all such embodiments as may come within the scope and spirit of the following claims and equivalents thereto.

We claim:

1. A computer-implemented method of encoding video with a video encoder, the method comprising:
   with the video encoder, encoding video that includes one or more pictures, each of the one or more pictures including luma samples and chroma samples, wherein range reduction of the luma samples and range reduction of the chroma samples, if performed, occur outside of a motion compensation loon; and
   outputting, from the video encoder, the encoded video in a bit stream according to a bit stream syntax, including:
      signaling a first set of one or more syntax elements for the range reduction of the luma samples of the one or more pictures of the video, wherein the first set of one or more syntax elements indicates whether the luma samples were mapped from an original luma sample range to a reduced luma sample range prior to subsequent encoding of the luma samples in the reduced luma sample range; and
      signaling a second set of one or more syntax elements for the range reduction of the chroma samples of the one or more pictures of the video, wherein the second set of one or more syntax elements indicates whether the chroma samples were mapped from an original chroma sample range to a reduced chroma sample range prior to subsequent encoding of the chroma samples in the reduced chroma sample range, and wherein the first set of one or more syntax elements is signaled separately from the second set of one or more syntax elements;
      wherein the bit stream syntax permits selective use of the range reduction of the luma samples but not the range reduction of the chroma samples;
      wherein the bit stream syntax permits selective use of the range reduction of the chroma samples but not the range reduction of the luma samples; and
      wherein the bit stream syntax permits use of different scaling factors between the range reduction of the luma samples and the range reduction of the chroma samples.

2. The method of claim 1 further comprising, as part of the encoding:
   determining whether to perform the range reduction of the luma samples and the range reduction of the chroma samples, wherein the determination of whether to perform the range reduction of the luma samples is independent of the determination of whether to perform the range reduction of the chroma samples;
   for the range reduction of the luma samples, if performed, scaling down the luma samples in a manner consistent with the first set; and
   for the range reduction of the chroma samples, if performed, scaling down the chroma samples in a manner consistent with the second set.

3. The method of claim 1 wherein the first and second sets are part of an entry point header for an entry point segment that includes the one or more pictures, and wherein the first and second sets apply to the one or more pictures of the video in the entry point segment.

4. The method of claim 1 wherein each of the first and second sets includes an on/off flag at a given layer of the bit stream syntax and, if range reduction is oil, a range reduction parameter at the given layer of the bit stream syntax.

5. The method of claim 4 wherein the range reduction parameter indicates a scaling factor from among multiple available scaling factors.

6. The method of claim 4 wherein the range reduction parameter indicates a look-up table from among multiple available look-up tables.

7. The method of claim 1 wherein the first set indicates, for a luma range reduction parameter, a scaling factor selected from among multiple available scaling factors, each of the multiple available scaling factors providing a different degree of reduction between the original luma sample range and the reduced luma sample range.

8. The method of claim 1 wherein the second set indicates, for a chroma range reduction parameter, a scaling factor selected from among multiple available scaling factors, each of the multiple available scaling factors providing a different degree of reduction between the original chroma sample range and the reduced chroma sample range.

9. A computer-implemented method of decoding encoded video with a video decoder, the method comprising:
   with the video decoder, parsing plural syntax elements of encoded video from a bit stream for video that includes one or more pictures, the bit stream being organized according to a bit stream syntax, each of the one or more pictures including lurna samples and chroma samples, including:
      parsing a first set of one or more syntax elements for range reduction of the luma samples of the one or more pictures of the video, wherein the first set of one or more syntax elements indicates whether the luma samples were mapped from an original luma sample range to a reduced, luma sample range prior, to subsequent encoding of the luma samples in the reduced luma sample range; and
      parsing a second set of one or more syntax elements for range reduction of the chroma samples of the one or more pictures of the video, wherein the second set of one or more syntax elements indicates whether the chroma samples were mapped from an original chroma sample range to a reduced chroma sample range prior to subsequent encoding of the chroma samples in the reduced chroma sample range, and wherein the first set of one or more syntax elements is signaled separately from the second set of one or more syntax elements;

wherein the bit stream syntax permits selective use of the range reduction of the luma samples but not the range reduction of the chroma samples;

wherein the bit stream syntax permits selective use of the range reduction of the chroma samples but not the range reduction of the luma samples; and wherein the bit stream syntax permits use of different scaling factors between the range reduction of the luma samples and the range reduction of the chroma samples; and with the video decoder, decoding the encoded video, wherein compensation for the range reduction of the luma samples and compensation for the range reduction of the chroma samples, if performed, occur outside of a motion compensation loop.

10. The method of claim 9 further comprising, as part of the decoding:

using the first set and the second set of syntax elements, determining whether to compensate for the range reduction of the luma samples and the range reduction of the chroma samples, wherein the determination of whether to compensate for the range reduction of the luma samples is independent of the determination of whether to compensate for the range reduction of the chroma samples;

for the compensation for the range reduction of the luma samples, if performed, scaling up the luma samples used at least in part on the first set; and for the compensation for the range reduction of the chroma samples, if performed, scaling up the chroma samples based at least in part on the second set.

11. The method of claim 9 wherein the first and second sets are part of an entry point header for an entry point segment that includes the one or more pictures, and wherein the first and second sets apply to the one or more pictures of the video in the entry point segment.

12. The method of claim 9 wherein each of the first and second sets includes an on/off flag at a given layer of the bit stream syntax and, if range reduction is on, a range reduction parameter at the given layer of the bit stream syntax.

13. The method of claim 12 wherein the range reduction parameter indicates a scaling factor from among multiple available scaling factors.

14. The method of claim 12 wherein the range reduction parameter indicates a look-up table from among multiple available look-up tables.

15. The method of claim 9 wherein the first set indicates, for a luma range reduction parameter, a scaling factor selected from among multiple available scaling factors, each of the multiple available scaling factors providing a different degree of reduction between the original luma sample range and the reduced luma sample range.

16. The method of claim 9 wherein the second set indicates, for, a chroma range reduction parameter, a scaling factor selected from among multiple available scaling factors, each of the multiple available scaling factors providing a different degree of reduction between the original chroma sample range and the reduced chroma sample range.

17. The method of claim 9 further comprising:
receiving the bit stream over a wireless communication connection; and
displaying the decoded video on a display.

18. A video encoder comprising:
a processor;
memory;
an input device, output device or communication connection; and
storage media storing computer-executable instructions for causing the processor to perform a method comprising:

encoding video that includes one or more pictures, each of the one or more pictures including luma samples and chroma samples, wherein range reduction of the luma samples and range reduction of the chroma samples, if performed, occur outside of a motion compensation loop; and outputting the encoded video in a bit stream according to a bit stream syntax, including:

signaling a first set of one or more syntax elements for the range reduction of the luma samples of the one or more pictures of the video, wherein the first set of one or more syntax elements indicates whether the luma samples were mapped from an original luma sample range to a reduced luma sample range prior to subsequent encoding of the luma samples in the reduced luma sample range; and signaling a second set of one or more syntax elements for the range reduction of the chroma samples of the one or more pictures of the video, wherein the second set of one or more syntax elements indicates whether the chroma samples were mapped from an original chroma sample range to a reduced chroma sample range prior to subsequent encoding of the chroma samples in the reduced chroma sample range, and wherein the first set of one or more syntax elements is signaled separately from the second set of one or more syntax elements;

wherein the bit stream syntax permits selective use of the range reduction of the luma samples but not the range reduction of the chroma samples;

wherein the bit stream syntax permits selective use of the range reduction of the chroma samples but not the range reduction of the luma samples; and wherein the bit stream syntax permits use of different scaling factors between the range reduction of the luma samples and the range reduction of the chroma samples.

19. The video encoder of claim 18 wherein the encoding comprises:

determining whether to perform the range reduction of the luma samples and the range reduction of the chroma samples, wherein the determination of whether to perform the range reduction of the luma samples is independent of the determination of whether to perform the range reduction of the chroma samples;

for the range reduction of the luma samples, if performed, scaling down the luma samples in a manner consistent with the first set; and for the range reduction of the chroma samples, if performed, scaling down the chroma samples in a manner consistent with the second set.

20. The video encoder of claim 18 wherein the first and second sets are part of an entry point header for an entry point segment that includes the one or more pictures, and wherein the first and second sets apply to the one or more pictures of the video in the entry point segment.

21. The video encoder of claim 18 wherein each of the first and second sets includes an on/off flag at a given layer of the bit stream syntax and, if range reduction is on, a range reduction parameter at the given layer of the bit stream syntax.

22. A video decoder comprising:
a processor;
memory;
an input device;
an output device;
a communication connection; and
storage media storing computer-executable instructions for causing the processor to perform a method comprising:
parsing plural syntax elements of encoded video from a bit stream for video that includes one or more pictures, the bit stream being organized according to a bit stream syntax, each of the one or more pictures including luma samples and chroma samples, including:
parsing a first set of one or more syntax elements for range reduction of the luma samples of the one or more pictures of the video, wherein the first set of one or more syntax elements indicates whether the luma samples were mapped from an original luma sample range to a reduced luma sample range prior to subsequent encoding of the luma samples in the reduced luma sample range; and
parsing a second set of one or more syntax elements for range reduction of the chroma samples of the one or more pictures of the video, wherein the second set of one or more syntax elements indicates whether the chroma samples were mapped from an original chroma sample range to a reduced chroma sample range prior to subsequent encoding of the chroma samples in the reduced drama sample range, and wherein the first set of one or more syntax elements is signaled separately from the second set of one or more syntax elements;
wherein the bit stream syntax permits selective use of the range reduction of the luma samples but not the range reduction of the chroma samples;
wherein the bit stream syntax permits selective use of the range reduction of the chroma samples but not the range reduction of the luma samples; and
wherein the bit stream syntax permits use of different scaling factors between the range reduction of the lurna samples and the range reduction of the chroma samples; and
decoding the encoded video, wherein the decoding comprises:
using the first set and the second set of syntax elements, determining whether to compensate for the range reduction of the luma samples and the range reduction of the chroma samples, wherein compensation for the range reduction of the luma samples and compensation for the range reduction of the chroma samples, if performed, occur outside of a motion compensation loop, and wherein the determination of whether to compensate for the range reduction of the luma samples is independent of the determination of whether to compensate for the range reduction of the chroma samples;
for the compensation for the range reduction of the luma samples, if performed, scaling up the luma samples based at least in part on the first set; and
for the compensation for the range reduction of the chroma samples, if performed, scaling up the chroma samples based at least in part on the second set.

23. The video decoder of claim 22 wherein the first and second sets are part of an entry point header for an entry point segment that includes the one or more pictures, and wherein the first and second sets apply to the one or more pictures of the video in the entry point segment.

24. The video decoder of claim 22 wherein each of the first and second sets includes an on/off flag at a given layer of the bit stream syntax and, if range reduction is on, a range reduction parameter at the given layer of the bit stream syntax.

25. The video decoder of claim 22 wherein the output device is a display and the communication connection is wireless, the method further comprising:
receiving the bit stream over the wireless communication connection; and
displaying the decoded video on the display.

* * * * *

UNITED STATES PATENT AND TRADEMARK OFFICE
CERTIFICATE OF CORRECTION

PATENT NO. : 8,014,450 B2
APPLICATION NO. : 10/989702
DATED : September 6, 2011
INVENTOR(S) : Shankar Regunathan et al.

Page 1 of 1

It is certified that error appears in the above-identified patent and that said Letters Patent is hereby corrected as shown below:

In column 19, line 43, in Claim 1, delete "loon;" and insert -- loop; --, therefor.

In column 20, line 29, in Claim 4, delete "oil," and insert -- on, --, therefor.

In column 20, line 55, in Claim 9, delete "lurna" and insert -- luma --, therefor.

In column 20, line 62, in Claim 9, after "reduced" delete ",".

In column 20, line 62, in Claim 9, after "prior" delete ",".

In column 21, line 36, in Claim 10, delete "used" and insert -- based --, therefor.

In column 21, line 63, in Claim 16, after "for" delete ",".

In column 23, line 38, in Claim 22, delete "drama" and insert -- chroma --, therefor.

In column 24, line 6, in Claim 22, delete "lurna" and insert -- luma --, therefor.

Signed and Sealed this
Twenty-ninth Day of November, 2011

David J. Kappos
*Director of the United States Patent and Trademark Office*